United States Patent
Dallmann et al.

(10) Patent No.: US 10,281,886 B2
(45) Date of Patent: May 7, 2019

(54) METHOD AND DEVICE FOR THE ENERGY-EFFICIENT CONTROL OF A PLANT

(75) Inventors: Michael Dallmann, Wendelstein (DE); Christiane Gast, Nürnberg (DE); Jörn Peschke, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 727 days.

(21) Appl. No.: 14/383,013

(22) PCT Filed: Mar. 6, 2012

(86) PCT No.: PCT/EP2012/053800
§ 371 (c)(1),
(2), (4) Date: Oct. 14, 2014

(87) PCT Pub. No.: WO2013/131556
PCT Pub. Date: Sep. 12, 2013

(65) Prior Publication Data
US 2015/0032230 A1    Jan. 29, 2015

(51) Int. Cl.
*G05B 11/01* (2006.01)
*G05B 15/02* (2006.01)
*G05B 19/418* (2006.01)

(52) U.S. Cl.
CPC ....... *G05B 15/02* (2013.01); *G05B 19/41865* (2013.01); *G05B 2219/32021* (2013.01);
(Continued)

(58) Field of Classification Search
None
See application file for complete search history.

(56) References Cited

U.S. PATENT DOCUMENTS

| 7,681,055 B2 | 3/2010 | Iijima |
| 7,805,206 B2 | 9/2010 | Haaks et al. |

(Continued)

FOREIGN PATENT DOCUMENTS

| CN | 101034285 | 9/2007 |
| CN | 201765488 | 3/2011 |

(Continued)

OTHER PUBLICATIONS

Optimal Power-Down Strategies; Optimal Power-Down Strategies Augustine J et al. Foundations of Computer Science, Proceedings, 45th Annual IEEE Symposium on Rome, Italy Oct. 17-19, 2004 Piscataway, NJ. USA, IEEE , pp. 530-539, XP010745701, DOI: 10.1109/FOCS.2004.50 ISBN: 978-0-7695-22298-9; 2004; IT; Oct. 17, 2004.

(Continued)

*Primary Examiner* — Diem K Cao
(74) *Attorney, Agent, or Firm* — Cozen O'Connor

(57) ABSTRACT

A method for energy-efficient control of an installation comprises providing a plurality of components, wherein at least one of the plurality of components is able to adopt at least a first, high-energy active state and a second, low-energy standby state. Individual components in the active state have logical dependencies among one another. The method also includes ascertaining for at least one of the plurality of components to store component-specific time information and non-component-specific time information based on the logical dependency with respect to at least one other component.

11 Claims, 8 Drawing Sheets

(52) U.S. Cl.
CPC ... *G05B 2219/34306* (2013.01); *Y02P 70/161* (2015.11); *Y02P 70/163* (2015.11); *Y02P 80/114* (2015.11); *Y02P 90/20* (2015.11); *Y02P 90/205* (2015.11)

(56) References Cited

U.S. PATENT DOCUMENTS

| | | | |
|---|---|---|---|
| 2010/0083017 A1* | 4/2010 | Fulkerson | G06F 1/3203 713/320 |
| 2010/0088261 A1 | 4/2010 | Montalvo | |
| 2010/0161121 A1* | 6/2010 | Finsterwalder | G05B 19/41835 700/245 |
| 2010/0168897 A1* | 7/2010 | August | G05B 19/042 700/105 |
| 2014/0275747 A1 | 9/2014 | Connor | |

FOREIGN PATENT DOCUMENTS

| | | |
|---|---|---|
| CN | 102378324 | 3/2012 |
| CN | 103562938 | 2/2014 |
| DE | 10326426 | 12/2004 |
| DE | 102010039313 A1 | 2/2012 |
| EP | 1 367 685 | 12/2003 |
| JP | 04-182399 | 11/2008 |
| WO | WO 2010034333 A1 | 4/2010 |
| WO | WO 2011/162586 | 12/2011 |

OTHER PUBLICATIONS

A Survey of Design Techniques for System-Level Dynamic Power Management; A Survey of Design Techniques for System-Level Dynamic Power Management Benini L et al, IEEE Transactions on very large Sacale Integration (VLSI) Systems, IEEE SErvice Center, Piscataway, NJ. USA, vol. 8, No. 3, p. 299 XP008057349, ISSN: 1063-8210, DOI: 10.1109/92.845896; 2000; US; Jun. 1, 2000.

* cited by examiner

METHOD AND DEVICE FOR THE ENERGY-EFFICIENT CONTROL OF A PLANT

CROSS-REFERENCE TO RELATED APPLICATIONS

This is U.S. national stage of PCT Application No. PCT/EP2012/053800, filed on Mar. 6, 2012, which is hereby incorporated herein in its entirety by reference.

DESCRIPTION OF THE RELATED ART

The costs of energy are rising continuously and the production of energy is becoming ever more involved and costly as a result of the decline in sources of raw material. Energy consumption has therefore now become an essential criterion in the decision to purchase products. This does not just apply to consumer products (good examples of consumer products will be the EU-wide introduction of the energy-saving lamp or the identification of household appliances on the basis of energy-saving classes). The manufacture of products also needs to take place as energy efficiently as possible.

Many complex installations in production automation, e.g., in the automotive industry, also continue to operate outside production times, including at weekends or on holidays. There are hardly any automated shutdown and startup processes for production installations and infrastructure components such as cooling or extraction installations. Operators are therefore concerned that manual startup does not work in time or at all.

In individual solutions, the infrastructure is powered down to a relatively low energy level (for example the compressed air in the systems is lowered) in the production-free time, such as the weekend. Such interventions are performed either manually or using simple timer programs. They can therefore be used only for relatively long rest periods.

The infrastructure also has a series of intelligent components (e.g., smoke extractors) that operate as needed (using controllers). However, they also have the problem that they cannot be transferred to a state in which they require a relatively long time to achieve production power again. They also have no information about when they need to operate at what power. Hence, the potentials for energy saving cannot be exploited to its full extent.

To address this problem, approaches such as that of a central energy switching controller have already been discussed that hierarchically use central control elements to put individual components of an installation into a low-energy standby mode and are able to wake them from this state again. However, these approaches assume that all the required information such as states of the components, internal dependencies, energy data, etc. from all the components to be monitored is known at one location.

Such a situation exists in the case of individual machines and installations, but not necessarily in the case of a factory building, which may contain a plurality of installations, such as in the case of the automotive industry. In that case, a wide variety of organizations, inter alia, are involved that look after the installations, provide for the factory building or are responsible for infrastructure components of the factory building. It would therefore be technically and organizationally very involved to compile this information. In addition, all the changes in the factory building need to be forwarded to such a switching controller in time, otherwise incorrect decisions would be made on the basis of incorrect prerequisites.

SUMMARY OF THE INVENTION

Therefore, there exists a great need for, and thus an object of the invention is to provide, a flexible system that can firstly transfer production installations and infrastructure components to a low-energy state when they are not required and can secondly return these systems and components to a high-energy state (production) again from the low-energy state in automated fashion. Another object of the invention is providing the adaptation involvement for existent controllers and control systems to be as low as possible.

Yet another object of the invention is solving the problem that startup of installations not only needs to take account of prerequisites (such as ongoing cooling) but also needs to involve the avoidance of energy spikes. Otherwise, excessively large turn-on currents may be needed that result in fuses responding or can even cause damage.

The aforementioned objects are achieved by method and apparatus disclosed in the claimed invention. In one embodiment, an inventive method for energy-efficient control of an installation breaks down the latter into individual infrastructure and installation components, with at least some of the components being able to adopt at least a first, high-energy active state and a second, low-energy standby state. At least individual components in the active state have logical dependencies among one another (such as compressed air supplies). Each component stores component-specific time information, and further, in particular non-component-specific, time information is ascertained for at least one component by taking account of the logical dependency with respect to at least one further component.

In one embodiment, an inventive apparatus for performing energy-efficient control in an installation comprises individual software components, each having a component-specific interface to precisely one of the infrastructure or installation components, at least one interface to at least one additional apparatus for performing energy-efficient control, and a processing logic unit for performing the inventive method described above.

Thus, a system is proposed that performs the shutdown and startup in the production installation by virtue of largely autonomously operating and parameterizable components. Each of the infrastructure and installation components has such a system.

In principle, this system is capable of shutting down installations and providing power again in good time on the basis of time stipulations. The system is also capable of avoiding energy spikes during the startup process. In addition, there is a central controller, that is to say a type of order manager, that forwards stipulations (e.g. work-shift-free times) to the associated components. Furthermore, this central controller affords the option of being provided with information about the states of the components or of the energy switching system and of changing parameterizations of the components centrally. In addition, switching programs can be executed virtually and thus tested.

This component reference allows parameterizations to be performed locally on the individual components of the installation by the respective specialists; no knowledge of the overall system is required for this. The required behavior for shutting down and starting up again is ascertained by the components independently.

A prerequisite for the method is that the components have a low-energy "standby" state from which they can be transitioned to the high-energy state of production, and vice versa, in automated fashion. In addition, it is assumed that the times for the state transitions are relatively constant and the dependencies of the components among one another exist only for the production. For example, an installation component such as door production does not require an infrastructure component such as an extraction installation.

Further advantageous aspects of the invention are set out below. In an advantageous embodiment of the invention, the ascertaining of the further non-component-specific time information is effected by virtue of accumulation of suitable component-specific time information.

In one embodiment, the component-specific time information comprises at least one of the following values: (1) length of time that the component requires in order to change from a high-energy active state to a low-energy standby state, (2) length of time that the component requires in order to change from an energy-saving standby state to a high-energy active state, and (3) length of time that the component needs to spend at least in one of these states so that a change from a high-energy active state to a low-energy state and back again actually makes sense in terms of energy.

The non-component-specific time information can be ascertained by the respective component independently by virtue of communication with the known connected components with which there is a logical relationship. In one embodiment, the calculation of the non-component-specific length of time can advantageously take account of the dependencies with respect to the infrastructure components.

In addition, the non-component-specific information is provided with a preassigned value, such as $\infty$, that can be used to recognize whether or not a calculation has been performed. If a recalculation has not been performed, the component is not transferred to a low-energy state.

An order for transferring the installation from a first overall state of energy intake to a second changed overall state of energy intake can advantageously be effected by the steps of (1) selecting suitable components by a central controller (also called order manager), (2) communicating the planned state change to the selected components by suitable control commands, (3) deciding the possibility of performance of the state change by the selected components on the basis of the time information stored in the components, and (4) in the event of a positive decision from the components, performing the state change based on the known component dependencies, particularly for the order in time in which the state changes are performed.

The ascertaining of the length of time and/or the performance of the state change that the component requires in order to change from a low-energy standby state to a high-energy active state can advantageously also involve a transgression of the average value of the energy intake during the state change also being taken into account.

BRIEF DESCRIPTION OF THE DRAWINGS

The invention is explained by way of example below with reference to the schematic illustrations in the appended figures. In the figures.

DETAILED DESCRIPTION OF THE PRESENTLY PREFERRED EMBODIMENTS

Figure 1:
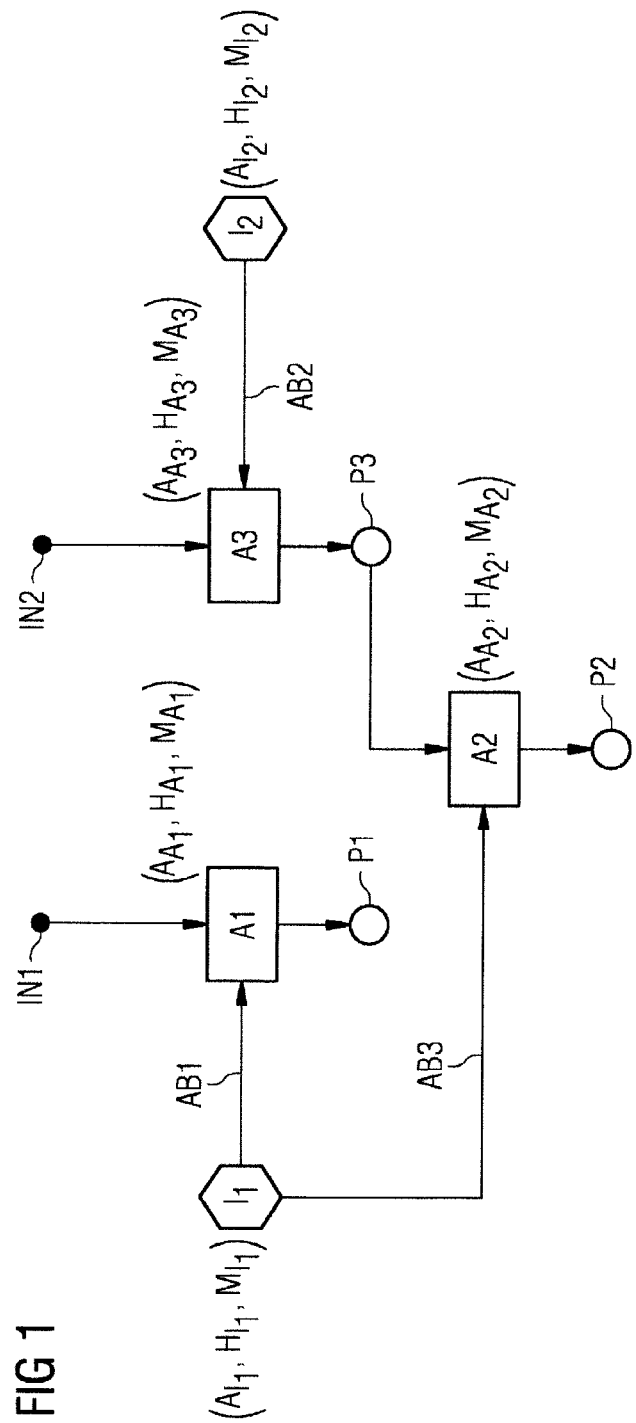
FIG. 1 shows an exemplary installation with three installation components and two infrastructure components in accordance with one embodiment of the present invention.

In the example in FIG. 1, an installation, to be more precise a production area, comprising the installation components A1, A2 and A3 and the infrastructure components I1 and I2, is intended to be "powered down", that is to say put into a lower-energy standby state, for a relatively long period of time. First of all, the structure of the installation is explained, the arrows showing the logical dependencies of the installation components among one another.

During production, the installation components A1 and A2 require the infrastructure components I1 in order to support production, whereas installation component A3 requires infrastructure component I2. Installation component A2 requires parts that are produced by installation component A3, and on account of a large buffer (P3) these dependencies are not considered further in the example. In relation to automobile construction, infrastructure components may be cooling systems and extraction installations, for example, whereas installation components are installations for bodywork production (e.g. doors).

It is assumed that each of the components considered has not only a higher-energy production mode but also a lower-energy standby mode, in which it consumes relatively little energy, but can be put back into the "normal" production mode again in automated fashion. If this is not the case, it is not possible for these components to be changed over to a low-energy mode, since automated return to the production mode is then not possible. To simplify matters, the text below refers to transition to the low-energy state as shutdown and return to production as startup of the component.

Figure 3:
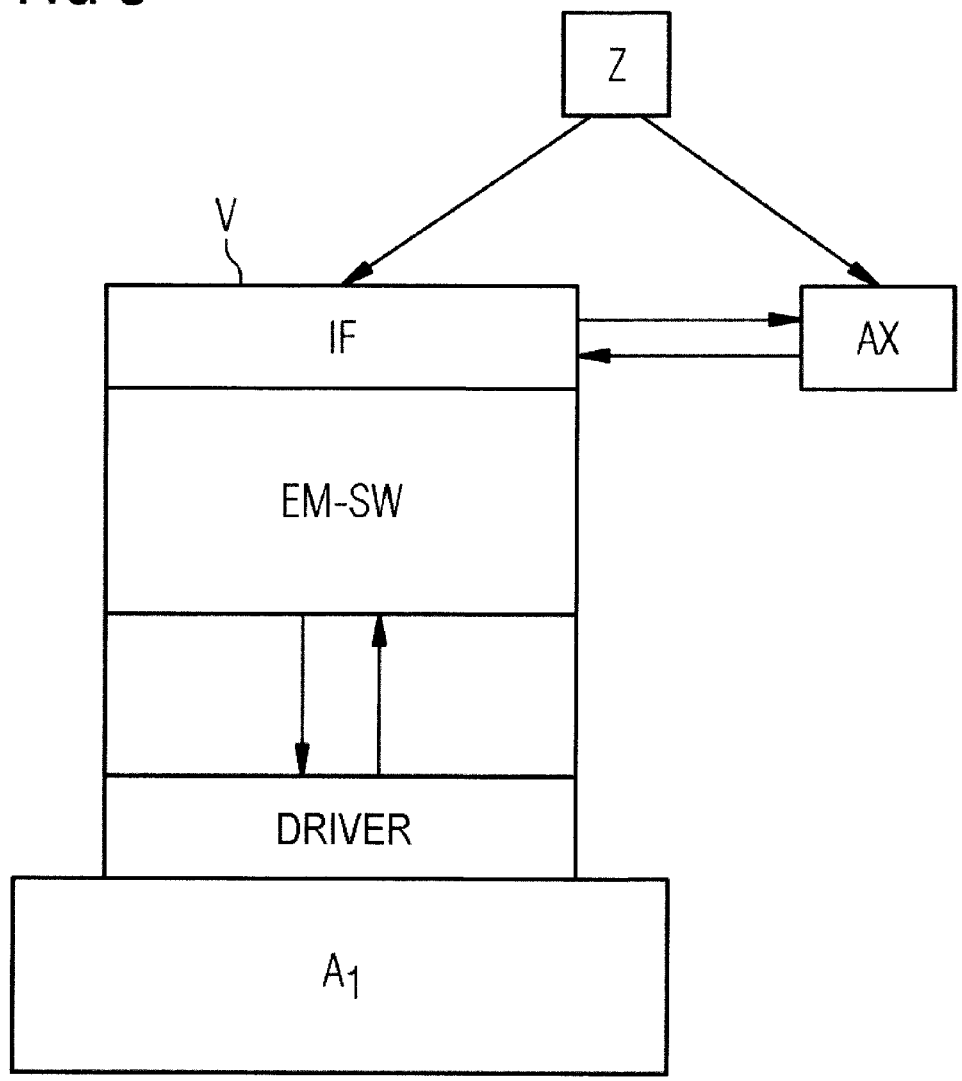
FIG. 3 shows the diagram of an inventive apparatus in accordance with one embodiment of the present invention.

According to FIG. 3, the energy management system now has one representative V, also called a proxy, per component. The representative knows the logical dependencies of the component. It thus knows what other components are a prerequisite for startup or for operation and knows component-specific parameters such as the time that the component requires for shutdown and startup when all the necessary prerequisites are met in each case, and possibly a minimum dwell time for the component in an adopted state.

The latter indicates the length of time where the components need to dwell as a minimum so that an actual energy saving occurs. This is necessary because the state transitions (from production to standby and back to production) sometimes consume more energy than can be saved thereby. By observing a minimum dwell time for the component in the respective state, this can be avoided. To this end, an energy balance needs to be established per component and the component-specific time information needs to be ascertained therefrom.

Since installation and infrastructure components have no standardized interfaces and state models, the architecture of the representative V is designed such that there is a component-specific driver layer that provides the representative with a standard access layer for the component A1. The layer forwards commands for shutdown and startup to the component in a suitable form and reports back states of the components in a standard form.

This results in the following architecture. The representative V comprises an internal processing logic unit EM-SW and an interface IF to the outside, which the representative V can use to communicate with the connected (dependent) components Ax and also with a central manager Z.

It is essential that the interface and processing logic unit levels are identical for all the components A, I and that the driver level provides the opportunity to fit these systems onto existing installations too, largely without repercussions, retrospectively—provided that the component permits a standby mode from which it can be awaken in automated fashion.

In relation to the example presented in FIG. 1, this means that installation components A1, A2, A3 that are in a low-energy state do not require an infrastructure component I1, I2 (such as an extraction unit). The individual components therefore know their local behavior. In order now to take a complex production facility (e.g. a factory building) out of production into a standby mode and back again, the dependencies of the system components among one another need to be taken into account.

Figure 2:
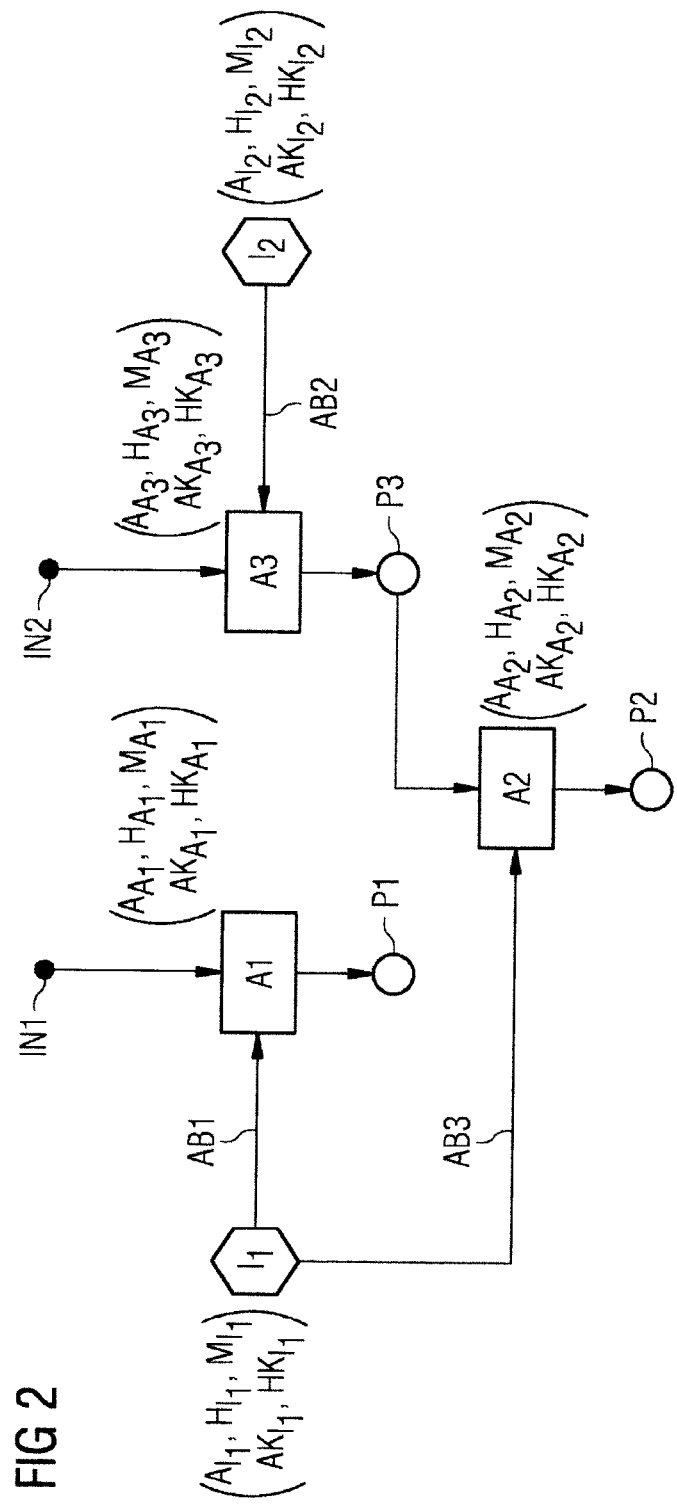
FIG. 2 shows the same installation structure with component-specific and non-component-specific time information in accordance with one embodiment of the present invention.

To this end, the components, as shown in FIG. 2, have further data fields AKA1, HKA1, AKI1, HKI1, . . . ) in order to continuously keep accumulated values that contain, relative to the stipulated times (e.g. shutdown at 22:00 hours), the times at which the component is actually powered down. This is effected in a similar fashion for the startup process.

The method for calculating accumulated values is now presented using the exemplary embodiment in FIG. 2. Startup process, which involves a transition from a low-energy to a high-energy state, is performed as follows:

From the logical dependencies there result prerequisites for individual installation and infrastructure components, and it is thus necessary for the infrastructure components to be started up, for example. Components on which no further components are dependent (e.g. A1) notify all the components on which they themselves are dependent of their startup times. As a result, the components on which they are dependent (e.g. I1 and I2) know what lead times and dwell times need to be taken into account for startup and store said times separately from their own values. They then forward this information to components on which they are dependent, etc. These times are denoted by HKA/HKI (accumulated startup time). If no such information is available, infinity ∞ is assumed in an advantageous embodiment.

Shutdown process, which involves a transition from a high-energy to a low-energy state, is performed as follows: In this case, the approach is similar to that for the startup process. The components on which no further components are logically dependent, e.g., A1, notify all the components on which they themselves are dependent of their data. As a result, the components that provide for them (e.g., I1, I2) know what lead times need to be taken into account for shutdown and store said times separately from their own values. In this case, it should be noted that the providing components use the highest value of the components that are directly dependent on them. Only when the last dependent component has been shut down is it also possible for the providing component to be shut down. They then forward this information in turn to components on which they themselves are dependent, etc. These times are denoted by AKA/AKI (accumulated shutdown time). If no such information is available, infinity ∞ is assumed, i.e. shutdown never takes place.

Figure 4:
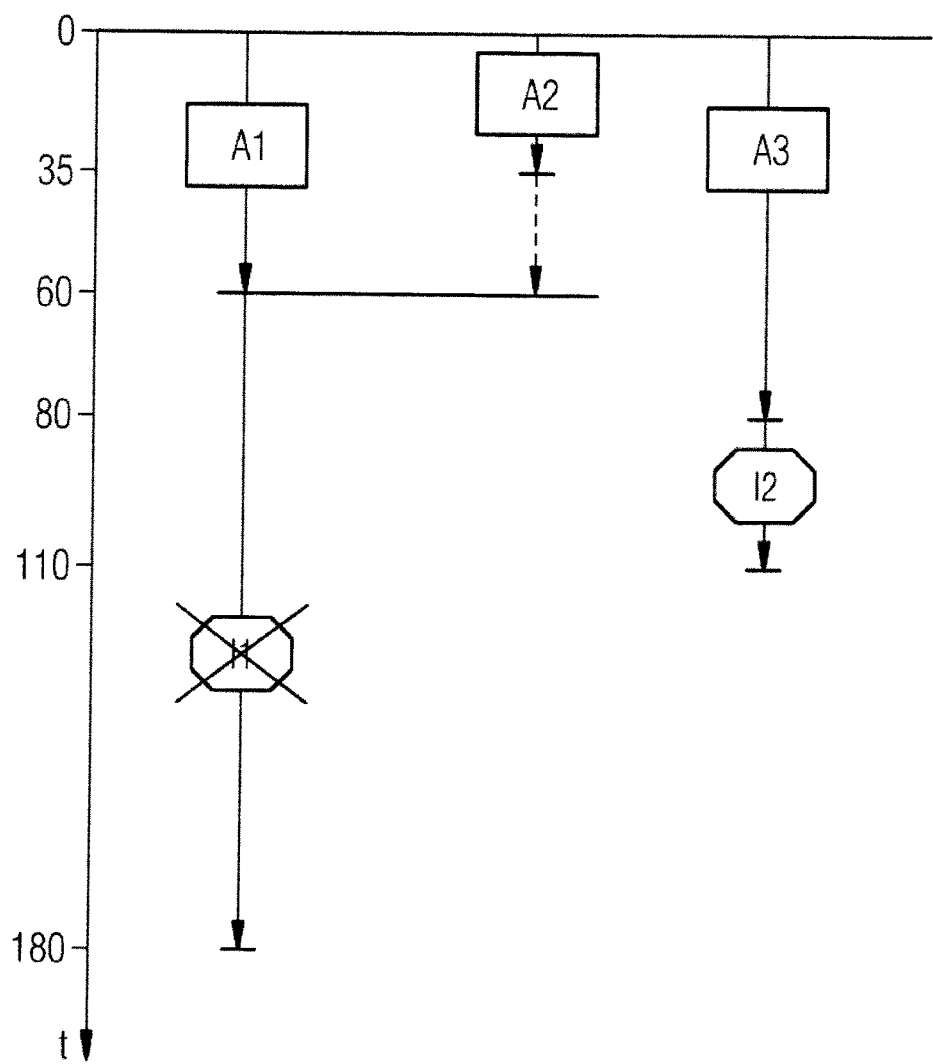
FIG. 4 shows a first example of a shutdown order for the installation from FIG. 1 in accordance with one embodiment of the present invention.

In line with FIG. 4, the accumulated data ascertained on the basis of the method are indicated.

| I1    |       |       |       |       |
|-------|-------|-------|-------|-------|
| AI1   | HI1   | MI1   | AKI1  | HKI1  |
| 120 s | 180 s | 240 s | 180 s | 280 s |
| I2    |       |       |       |       |
| AI2   | HI2   | MI2   | AKI2  | HKI2  |
| 30 s  | 55 s  | 95 s  | 110 s | 185 s |
| A1    |       |       |       |       |
| AA1   | HA1   | MA1   | AKA1  | HKA1  |
| 60 s  | 100 s | 200 s | 60 s  | 100 s |
| A2    |       |       |       |       |
| AA2   | HA2   | MA2   | AKA2  | HKA2  |
| 35 s  | 65 s  | 110 s | 35 s  | 65 s  |
| A3    |       |       |       |       |
| AA3   | HA3   | MA3   | AKA3  | HKA3  |
| 80 s  | 130 s | 300 s | 80 s  | 130 s |

In this regard, as an example, consider the order T2 in FIG. 4, in the case of which a production-free time is identified between 12:00 and 12:09. The energy management system ascertains what components can be put into a standby state in the time, so that an energy saving is obtained. By way of example, I1 cannot shut down until A1 and A2 have been shut down, i.e., I1 needs to wait at least 60 seconds until it is itself able to initiate the transition to the standby mode. The shutdown process for I1 therefore lasts 60+120=180 sec. By contrast, A1 can change to the standby mode immediately, and in this case the shutdown time corresponds to the time that the component itself requires.

During startup, it is necessary for I1 to start up before A1 and A2 can start up, i.e., for I1 the startup process needs to have concluded at least 100 sec (startup value of A1) before the start of production, i.e., I1 needs to begin the startup process—in relation to the production appointment of 12:09—180+100 seconds beforehand.

The components can use the accumulated times to autonomously decide whether or not they can shut down. For this, it is merely necessary to form a minimum time from the sums of the shutdown time, the minimum dwell time and the startup time per component. For example, minimum time=accumulated shutdown time+minimum dwell time+ accumulated startup time. For instance, the following values can be obtained:

A1: 60+100+200=360 s
A2: 35+110+65=210 s
A3: 80+300+130=510 s
I1: 180+240+280=700 s
I2: 110+95+185=390 s

It can be seen that I1 requires at least 700 seconds in order to shut down and start up again in this configuration (when energy needs to be saved). This is much longer than the prescribed pause time from 12:00 hours to 12:09 hours, which means that a shutdown process does not take place in this case, as illustrated above. All the other components are below this in terms of overall time, i.e., the shutdown process of A1, A2, A3 and I2 takes place.

In the case of the startup process, I1 no longer needs to be considered, since shutdown has not taken place. Before A3, I2 needs to be started up. The subsequent FIG. 5 shows the overall process and flow of transition from production to standby and back again (order T2).

Figure 5:
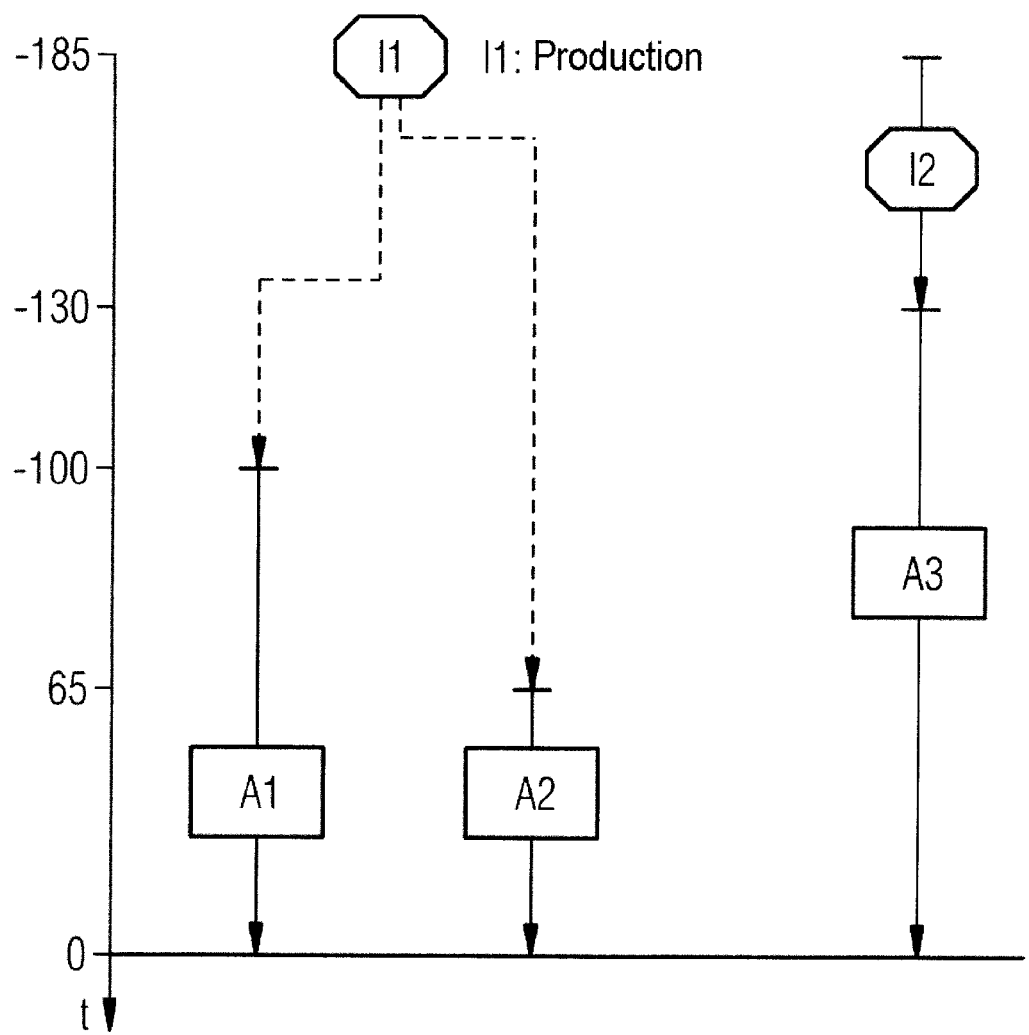
FIG. 5 shows an example of a turn-on order for the installation following shutdown as shown in FIG. 4 in accordance with one embodiment of the present invention.
Figure 6:
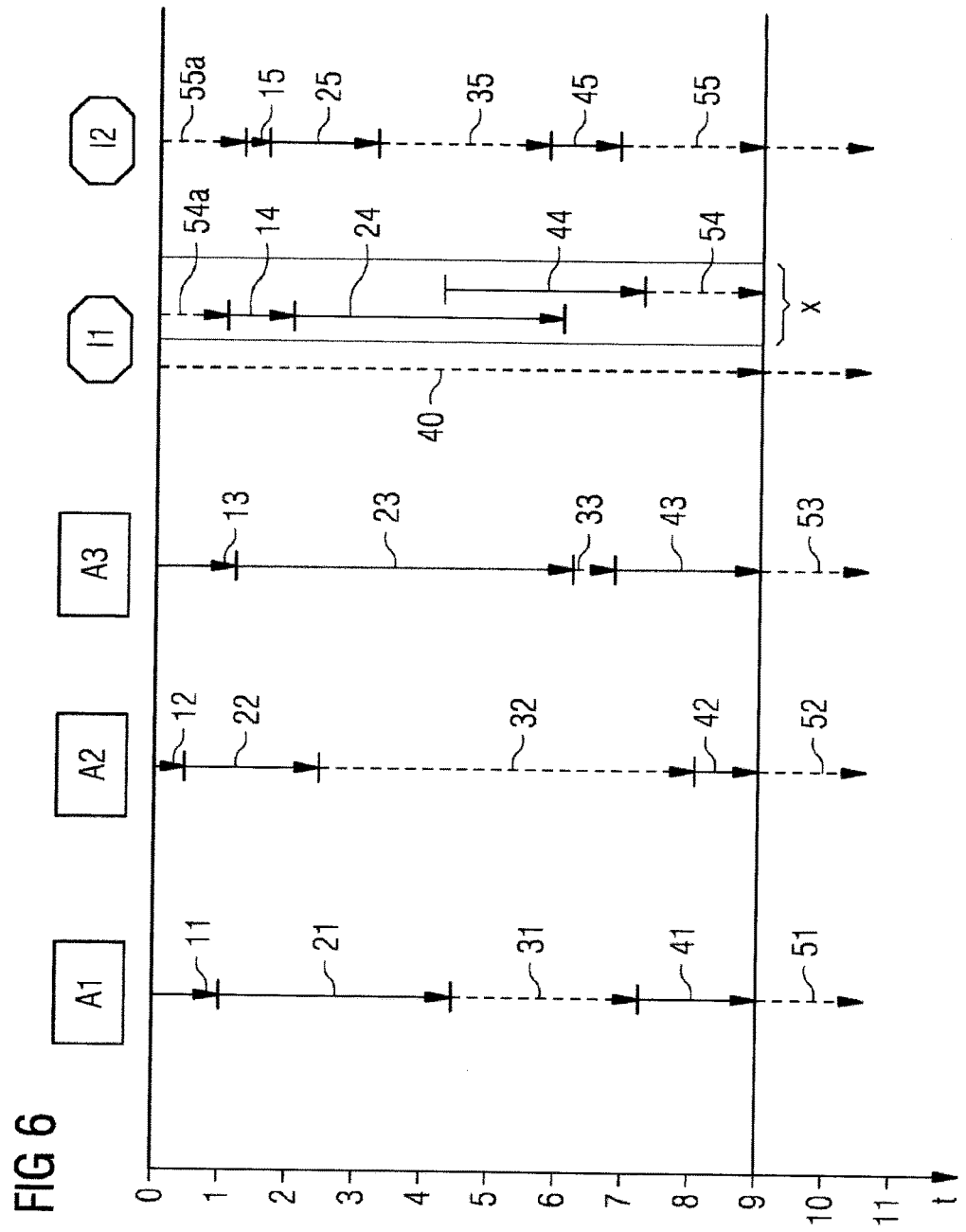
FIG. 6 shows a transition from production to standby and back in accordance with one embodiment of the present invention.

The example shown in FIGS. 4, 5 and 6 clearly shows a further problem that is addressed by the present invention. Shortly before the beginning of production, all the installation components start up simultaneously and thus produce energy spikes. This can advantageously be avoided if further logical dependencies between the components are registered. In that case, however, sequential execution of the components takes place, which may not be optimum in terms of energy.

FIG. 6 again shows the process of powering the installation down and up again between 12:00 hours and 12:09 hours, as desired. Following evaluation of the present times, the component I1 is not powered down, and the following is obtained for the other components:

Shutdown phase, 11, 12, 13, 15
Minimum dwell time, 21, 22, 23, 25
Additional dwell time (standby, low-energy), 31, 32, 33, 35,
Startup phase, 41, 42, 43, 45
Components in the production state, 40, 51, 52, 53, 55.

An alternative to this is the introduction of a modification time for startup of the components, which ensures that the beginning of the startup process of a component takes place earlier than is absolutely necessary. For the method, the situation is then that the startup time becomes "longer". The subsequent example from FIG. 6 shows the principle for avoiding energy spikes by modifying the starting instant for startup.

For A1, in addition to the startup time, a modification or extension time of 90 seconds is registered. As a result, A1 is started up 90 seconds earlier, and the energy spikes can thus be avoided. In this case, automatisms are likewise possible in order to ascertain such displacements (including any adaptions to the minimum dwell time).

Figure 7:
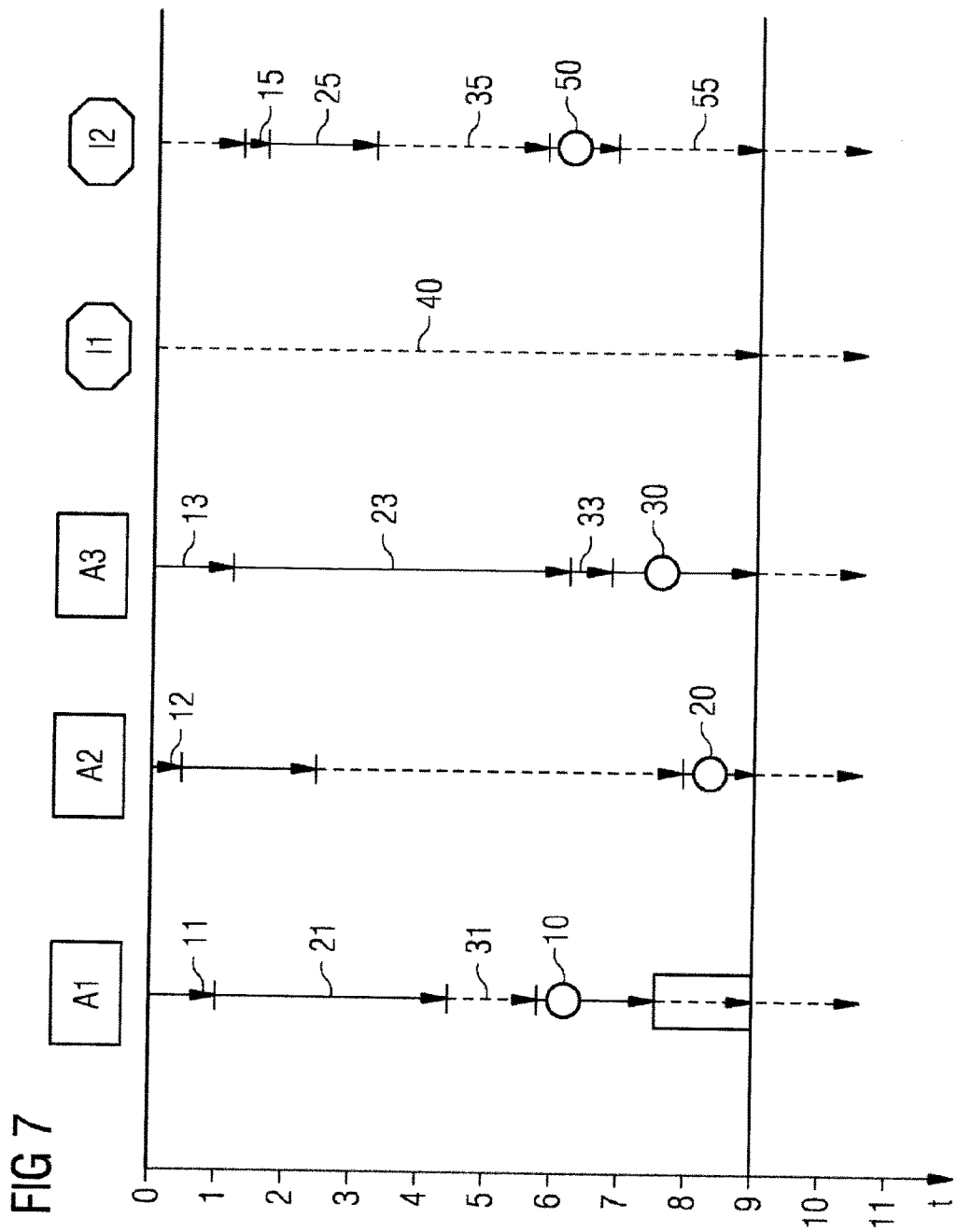
FIG. 7 shows an example taking account of voltage spikes in the components in accordance with one embodiment of the present invention.

The flow of shutdown and startup is illustrated in FIG. 7. The accumulated times are ascertained when the energy management system is started up. To this end, the components that are not a prerequisite for others are identified during the parameterization.

On the basis of these components, the accumulated times are then calculated and forwarded, as explained in the example above. For the dependencies, the method takes place in a similar fashion. By way of example, A1 knows that I1 needs to run as a prerequisite. However, I1 itself does not know (and also does not need to know) what components are dependent thereon. The components that are dependent on I1 forward this information (together with the time statements).

Components that are not identified as a starting point set the accumulated values to infinity upon startup and therefore know that a report is still pending. The data are forwarded even when a parameter change takes place on a component. The component then forwards its data in accordance with the method above. Hence, the accumulated times are known following startup.

If a production-free time is now due, a central entity Z (an order manager), for example, can be used to send a communication to all the components that are to be considered with details of the start and the end of the pause. On the basis of the accumulated times, the components then independently decide when and whether they shut down and start up again. Regardless of this, each component checks prerequisites and dependencies for the processes (this is accomplished by the components themselves even without the energy management system). If errors occur, the process of powering the local component down and up is prevented—with the corresponding consequences for connected systems. The components log their actions and communicate their states upon request.

Figure 8:
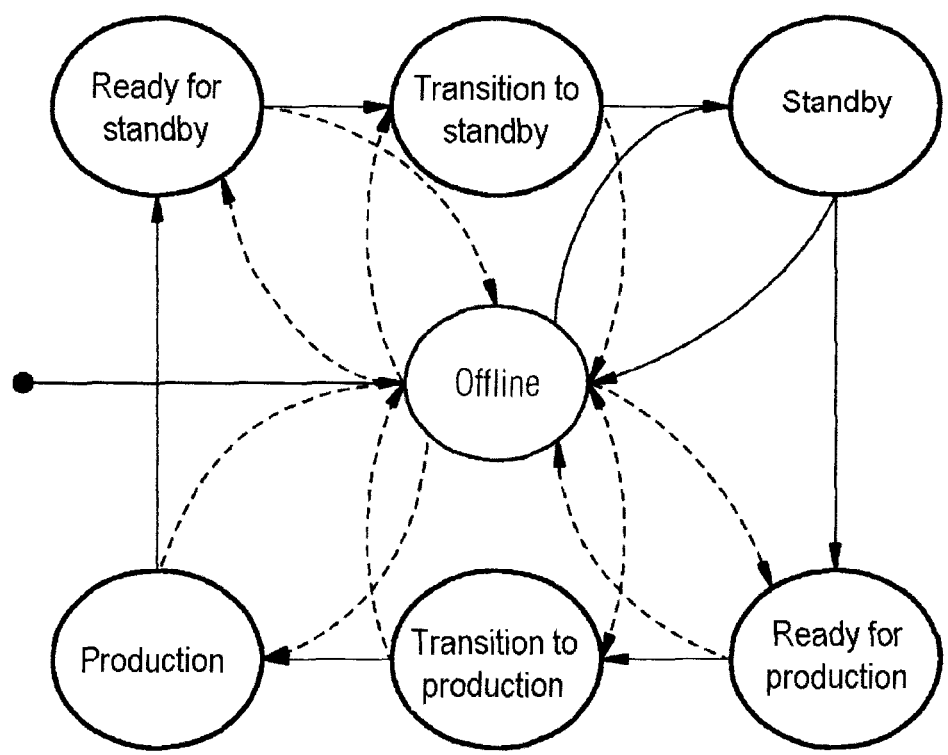
FIG. 8 shows an overview of an exemplary state model for a component in accordance with one embodiment of the present invention.

For implementation, the components in this case use the following state model, as shown in FIG. 8, in which not only production and standby are kept as a state, but also the transition phases: when the energy management system is started up, the components are initially in the "offline" state when there is not yet a connection to the installation and there has been no report back. The state of the component (which state is ascertained via the driver level) is then taken or the "offline" state set if the component is in an unknown state (e.g. fault) or the state cannot be ascertained.

Assuming that the component is in the "production" state, if there is an order to save energy, i.e., a production-free time is reported, all the affected components are put into the "ready for standby" state at the starting instant of the time window, provided that the minimum time is shorter than the reported production-free time. If components are then "shut down", they change to the "transition to standby" state. Once the low-energy state has been reached, "standby" is registered. A similar process is used for the transition to the "production" state.

If dependencies need to be taken into account—e.g., 12 cannot power down until A3 is in standby—A3 reports all the state changes to the components on which A3 is dependent. The components power down only when all the dependent components are already in standby and the calculated instant for powering down has been reached. If delays arise in the dependent components, as a result of which the calculated time is exceeded, the representative recalculates the situation, i.e., it ascertains whether it can still shut down and start up efficiently in terms of energy in the period. If not, the order is ignored.

The representatives of the components have an interface—a user interface—that can be used to retrieve this information. In particular, dependent components can exchange this information with one another, as indicated in the example. Once states have been initiated by the energy management system, the order to which the state relates is also indicated for the state.

The inventive system is based on operational states of the individual components rather than on internal technical or technological synchronization points. This means that the system does not need to perform any coordination or synchronization of startup processes (e.g. bus christenings, ascertaining of master systems). This needs to take place on a different level. It is expected that the components provide interfaces that can be used to shut down and start up the components and is used to report the result status.

The shutdown is not complete shutdown; the system needs to maintain safety monitoring facilities (e.g., monitoring) for an automatic restart and must be able to be awaken from the "shut-down" (or better: standby state) again. This is the case with infrastructure components that can be controlled using timer programs, for example.

In the case of existing installations, introduction of the inventive method would possibly require adaptation or extension of the automation or control level. In this way, however, relatively simple interfaces can be obtained that have a good chance of also being used in existing installations.

The implementation of the logic is the same for all the components, and only the link to the actual real systems (call level for shutdown and startup) may be different. The system can run on the control or automation level.

The parameterization of components advantageously requires the provision of a way (e.g., a flag) of preventing the automatic shutdown for the component, for example, in order to prevent shutdown and startup processes in the case of increased wear on a component. If faults or maintenance work are/is occurring, the "offline" state needs to be set.

In the case of the communication interface, a command needs to be implemented that initiates immediate startup or shutdown (from the point of view of the energy management, the automation-dependent mechanisms are maintained). The latter command is used to initiate startup or shutdown a second time in the event of a fault.

The system operates exclusively on a time basis. It does not ascertain any energy values and also does not undertake any corresponding energy considerations. This avoids having to take account of complex energy balances at run time. Instead, the dwell time is used to specify a period that states that shutdown and startup make no sense in terms of energy without this minimum dwell time in the standby state.

When an order has been executed, it is erased from the memory of the components. The components have a queue of orders. If errors occur during startup (e.g., because a person is in the safety area and the installation therefore cannot be started up), appropriate reports are sent. Effects of the fault can be indicated using an additional visual display component (e.g., which components dependent thereon can no longer be started up).

The inventive energy management system cannot interpret error reports from the components and is also not meant to. As a result, a startup command also cannot be repeated in automated fashion. Instead, two options are advantageously provided. Each component has a user interface that can be used to indicate and adapt the parameterization and the pending orders. In addition, said interface can give commands for shutting down and starting up the component under consideration.

Alternatively, a central location Z (an order manager) can be used to perform the same action. In that case, however, this is not just for individual components but then also for installation complexes, regardless of the states they are in. This means that the central location can be used to initiate startup of a factory building, for example, retrospectively if errors occurred during the startup process.

This can also be effected under priority control, i.e., pending orders are ignored and the command from the order manager is given preference. If errors occur during shutdown, the component either remains in the transition state or changes to the "offline" state.

In principle, dependencies can produce loops that prevent shutdown or startup (if each component is dependent on each one). During parameterization, this needs to be checked, e.g., if accumulated times become too great. In practice, this situation should not arise, however, since otherwise the installation itself has a problem.

The individual systems then still need to receive their orders. To this end, there is a central entity that converts requests from the outside (e.g. shift schedules) into orders for the individual components of the energy management system.

During parameterization of the systems, this order management needs to be registered as a central entity with a communication address. The systems log onto the order manager when the system is started up. In addition, they notify the manager of their values (startup times, etc.). This is also effected for parameter changes.

The manager is responsible for a group of components, for example, all the components in a factory building. The parameterization of the individual systems needs to be set up accordingly. A component may always be associated with just one order manager. The manager affords the option of requesting and changing the parameterizations of the components at a central location (both times and dependencies).

There is the option of running through and testing processes in advance in a virtual mode. The manager also affords the option of removing particular components from shutdown processes if desired (e.g. for reasons of wear) or of starting up or shutting down particular components manually if faults have occurred.

In summary, a system for increasing energy efficiency is presented that, by virtue of largely autonomously operating components, allows installation complexes along with infrastructure to be transferred to a low-energy state and back to production again. For each installation or infrastructure component, only the parameters that are necessary for this component need to be registered. Overall understanding of the installation complex and the infrastructure is not necessary.

In practice, this knowledge is scattered over a plurality of organizational units in the case of large installations (e.g. in automobile construction). Hence, the responsibilities are also usually different, which makes setup and parameterization of a central system (as an alternative) more difficult. This applies particularly to changes to installations. If complex factory buildings are being considered, the probability of changes being made to individual installations or installation components is relatively high.

The method described provides that fresh parameterization needs to be created only for the affected installation, wherein the parameterization is loaded into the energy management system when the new installation is activated. All further actions take place automatically. In the case of a centrally managed system, the handling in the case of such changes is much more complicated.

A simple method is presented that can be used by the systems to ascertain instants at which and whether individual components need to be shut down and started up in the overall complex for a prescribed production-free time. The basis for this is simple time statements and not complex energy balance calculations, as it is possible to include appropriate balances without any problem. The method uses a minimum dwell time to take account of the fact that sometimes the state transition results in a higher level of consumption than can be saved.

The inventive system can avoid energy spikes by virtue of the starting instant in the startup process being able to be shifted by a relevant modification time. The system provides simple interfaces to the real installation components (states and calls for state transitions). All the representatives operate in the same manner, and only the link to the real component is component-specific.

Although the present invention has been described above with reference to presently preferred embodiments, it is not limited thereto but rather can be modified in a wide variety of ways. In particular, the invention can be altered or modified in multifarious ways without departing from the essence of the invention.

The invention claimed is:

1. A method for energy-efficient control of an installation, comprising:

providing a plurality of components, at least one component of the plurality of components being configured to adopt at least a first, high-energy active state and a second, low-energy standby state, and individual components in the active state having logical dependencies among one another, each of the plurality of components being switched to the low-energy standby state when they are not required, and each component of the installation having a component-specific interface to one component of the plurality of components, at least one interface to at least one other apparatus and a processing logic unit;

storing at each of the plurality of components component-specific time information;

ascertaining, by the processing logic unit, non-component-specific time information for at least one component of the plurality of components based on the logical dependencies among each of the plurality of components with respect to at least one other component; and providing, by the processing logic unit, each of the plurality of components with a minimum dwell time which indicates a length of time the at least one component of the plurality of components needs to dwell such that an actual energy savings occurs.

2. The method of claim 1, wherein said ascertaining the non-component-specific time information occurs via accumulation of suitable component-specific time information.

3. The method of claim 1, wherein the component-specific time information comprises at least one of:

(i) length of time that a component requires to change from the first, high-energy active state to the second, low-energy standby state, (ii) length of time that the component requires to change from the second, low-energy standby state to the first, high-energy active state, and (iii) length of time that the component requires to operate at least in one of the first, high-energy active state and the second, low-energy standby state.

4. The method of claim 1, wherein at least one of the plurality of components comprises one of an installation component and an infrastructure component.

5. The method of claim 1, wherein the non-component-specific time information is ascertained by a respective component independently.

6. The method of claim 1, wherein the calculation of the non-component-specific length of time of a component takes into account the dependencies with respect to other components.

7. The method of claim 1, wherein the non-component-specific information has a preassigned value, including ∞.

8. The method of claim 1, wherein the installation is transitioned from a first overall state of energy intake to a second, changed overall state of energy intake by:

(i) selecting suitable components by a central controller, (ii) communicating a planned state change to the selected components by suitable control commands, (iii) deciding whether performance of the planned state change by the selected components based on time information stored in the components is possible, and (iv) in an event of a positive decision from the components, performing the state change taking into account known component dependencies.

9. The method of claim 3, wherein said ascertaining of at least one of the length of time and the performance of the state change that a component requires to change from the second, low-energy standby state to the first, high-energy active state comprises a transgression of an average value of an energy intake during the state change, and wherein said ascertaining is based on increasing a length of time the component requires to change from the second, low-energy standby state to the first, high-energy active state by an additional length of time for modification.

10. The method of claim 1, wherein, in an event of a malfunction in a component, error handling is made possible, via one of a locally and centrally controlled transfer of control commands from a central controller to the component.

11. An apparatus for performing energy-efficient control in an installation, comprising:

a plurality of components, at least one component of the plurality of components being configured to adopt at least a first, high-energy active state and a second, low-energy standby state, individual components in an active state having logical dependencies among one another, each of the plurality of components storing component-specific time information, and each of the plurality of components being switched to the low-energy standby state when they are not required, each component of the installation having:

a component-specific interface to component of the plurality of components, at least one interface to at least one other apparatus for performing energy-efficient control, and a processing logic unit configured to:

ascertain non-component-specific time information for at least one component of the plurality of components based on logical dependencies among each of the plurality of components with respect to at least one other component, and provide a minimum dwell time which indicates a length of time the at least one component of the plurality of components needs to dwell such that an actual energy savings occurs.

* * * * *